Figure 1:
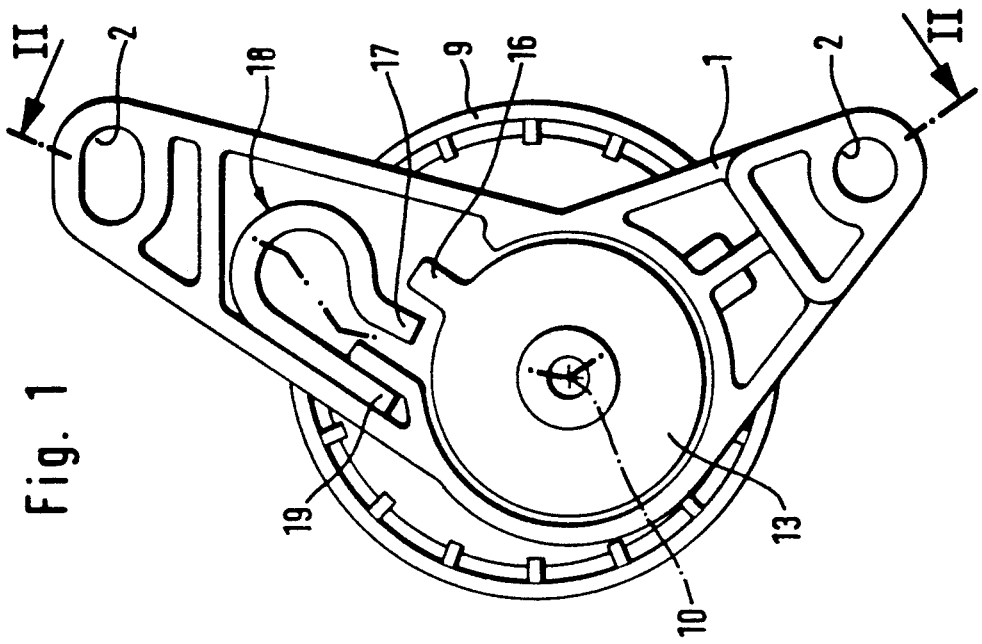

United States Patent [19]
Golovatgai-Schmidt et al.

[11] Patent Number: 5,288,276
[45] Date of Patent: Feb. 22, 1994

[54] TIGHTENING DEVICE FOR A DRIVE BELT

[75] Inventors: Eduard Golovatgai-Schmidt, Nuremburg; Karl-Ludwig Grell, Aurachtal, both of Fed. Rep. of Germany

[73] Assignee: Ina Walzlager Schaeffler AG, Fed. Rep. of Germany

[21] Appl. No.: 29,012

[22] Filed: Mar. 10, 1993

[30] Foreign Application Priority Data

Mar. 19, 1992 [DE] Fed. Rep. of Germany ....... 4208840

[51] Int. Cl.$^5$ ............................................... F16H 7/08
[52] U.S. Cl. ..................................... 474/133; 474/135
[58] Field of Search ........ 474/101, 109, 111, 113–117, 474/133–135

[56] References Cited

U.S. PATENT DOCUMENTS

| | | |
|---|---|---|
| 4,696,663 | 9/1987 | Thomey et al. ................. 474/135 X |
| 4,822,322 | 4/1989 | Martin ................................. 474/135 |
| 4,834,694 | 5/1989 | Martin ................................. 474/135 |
| 4,906,222 | 3/1990 | Henderson ....................... 474/135 |
| 4,978,326 | 12/1990 | Henderson ....................... 474/135 |

Primary Examiner—Thuy M. Bui
Attorney, Agent, or Firm—Bierman and Muserlian

[57] ABSTRACT

In a tightening device for a drive belt in an internal combustion engine, particularly for a toothed belt in the camshaft gear with a tension roller supported on a pivoting lever comprising a tension spring acting upon the pivoting lever in the direction of tension and a blocking device opposing the motion of the pivoting lever, whose blocking element changes its position as a function of the temperature, the blocking element formed as an end stop by the free end (17) of a preferably plate shaped stop body (18) whose other end (19) is held in a fixed housing (1) wherein the end stop in the operating state of the internal combustion engine is disposed at a distance from the adjacent support face of the pivoting lever. The tightening device with the thermally adjustable end stop avoids a tooth jump, particularly in the case of long belts.

9 Claims, 1 Drawing Sheet

TIGHTENING DEVICE FOR A DRIVE BELT

STATE OF THE ART

Tightening devices for a drive belt in an internal combustion engine, particularly for the toothed belt in the camshaft gear with a tension roller supported on a pivoting lever comprising a tension spring acting upon the pivoting lever in the direction of tension and a blocking device opposing the motion of the pivoting lever, whose blocking element changes its position as a function of the temperature are customarily disposed in the return phase (loose side of the belt) where lower tension forces occur rather than in the draw phrase so that the tension spring is set to these lesser tension forces. It is possible in special cases to fall below the required belt tension and such a special case is, for example in the motor of a motor vehicle if it is parked uphill in the direction of driving in forward gear so that the motor, due to the weight of the motor vehicle, tends to rotate in reverse. The pull phase of the belt is then shifted to the tension roller and thereby greater forces are transmitted by the belt onto the tension roller and the pivoting lever.

If the pivoting lever with the tension roller did not have an end stop, the roller would be pushed so far toward the outside that upon starting the motor when the return phrase is suddenly placed again on the tension roller of the belt, a tooth jumping could occur on a gearwheel. In that case, on the control belt made as a toothed belt for the camshaft drive, one or more teeth could be jumped on the driving toothed wheel. Thereby, a valve drive misadjustment would be effected which would cause motor damage by the valve disks striking on the piston heads.

DE-OS 37 41 860 describes a tightening device whose blocking arrangement has a catch implemented on a lever which cooperates with a blocking toothing of the pivoting lever. For the lever, a special control element with a connecting rod is required and this configuration has the disadvantage that it is structurally very complex. EP-OS 00 38 233 describes a tightening device of the initially stated type in which the blocking element is the free end of a connecting rod which is displaceably disposed in a housing and projects from it. The connecting rod is axially displaced relative to the housing due to thermal expansion and this tightening device, due to the housing which is subject to thermal expansion, has the disadvantage of considerable structure complexity. DE OS 36 37 212 describes a tightening device in which the belt tension force is applied by a force generator operating as a function of the temperature but a blocking arrangement for the pivoting lever cannot be found in this prior publication.

OBJECTS OF THE INVENTION

It is an object of the invention to provide a belt tightening device which will operate reliably and has a simply constructed blocking arrangement for the pivoting lever.

This and other objects and advantages of the invention will become obvious from the following detailed description.

THE INVENTION

The novel tightening device of the invention for a drive belt in an internal combustion engine, particularly for the toothed belt in the camshaft gear with a tension roller supported on a pivoting lever comprising a tension spring (12) acting upon the pivoting lever in the direction of tension, a blocking device opposing the motion of the pivoting lever whose blocking element changes its position as a function of the temperature, characterized in that the blocking element is formed an end stop by the free end (17) of a preferably plate shaped stop body (18) whose other end (19) is held in a fixed housing (1), and the end stop in the operating state of the internal combustion engine is dispose at a distance to the adjacent support face of the pivoting lever (7).

The object of the invention is obtained by the blocking element being formed as an end stop by the free end of a preferably plate-shaped stopping body whose other end is held in a fixed housing and that the end stop in the operating state of the internal combustion machine is disposed at a distance to the adjacent support face of the pivoting lever. Due to this thermally adjustable end stop, a tooth jump is avoided particularly in the case of long belts. With short toothed belts having a length of up to approximately 1,200 mm, a stationary end stop is sufficient, which permits operating oscillations of the belt tension roller and thermal expansion of the motor block but prevents a tooth jump when the motor is turned off. In the case of very long belts, on the other hand, the stationary stop due to the thermal expansion of the motor would need to be disposed so far removed from the operating position of the belt tension roller that a tooth jump of the belt would be possible during the cooling of the motor. Due to the use of the thermally adjustable end stop, however, the tooth jump can be avoided even in the case of long belts.

With the stop body of the invention, an extremely simple construction of the tightening device results. The stop body can be made for example as a horseshoe-shaped plate wherein it is possible to construct the plate as a bimetallic plate or as a plate made of a memory alloy.

For a simple but reliably functioning construction of the tightening device, the support face of the pivoting lever for the free end of the stop body can be made as a projection of a disk fixed by connection with the pivoting lever. The pivoting lever can be an eccentric lever which is fastened on an end of a shaft rotatably supported in the housing whereby a space-saving of the tightening device results because the eccentric lever can be disposed within the tension roller rotatably supported on it.

A good utilization of space results if the disk having the projection is a pressure disk of a damping device of the lever motion. The pressure disk can be fastened on the end of the shaft which is facing away from the eccentric lever and this pressure disk can be disposed, together with the stop body, within the fixed housing of the tightening device and is simultaneously protected against the environment. The tension spring can be implemented as a helical spring encompassing the shaft which presses the pressure disk in the axial direction of the shaft against a friction disk of the damping device bearing against the housing. The helical spring assumes in this arrangement the function of the damping force generator wherein it acts in the axial direction, as well as of the tension force generator wherein it acts in the circumferential direction.

Referring to the drawings:

FIG. 1 is a view of a tightening device, and

Figure 2:
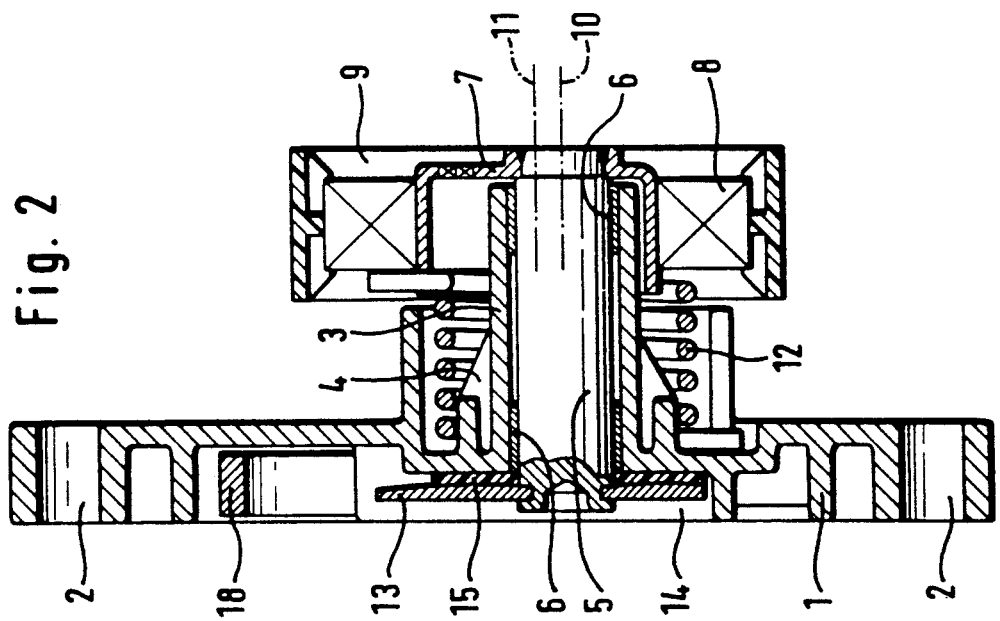

FIG. 2 an axial cross-section through the tightening device along line II—II of FIG. 1.

The belt tightening device comprises a housing 1 with two mounting holes 2 at a distance from each other for fastening the housing to a motor block. Integrally with the housing 1 is a projecting bearing sleeve 3 which has on its outside axis-parallel reinforcement ribs 4. The bearing sleeve 3 serves as the pivoting support of a shaft 5 with pivot bearings 6 not shown in further detail.

On one end of the shaft 5, a pivoting lever 7 is welded on and this supports at its free end a bearing 8 for a tension roller 9 which is disposed axis-parallel to the shaft 5. The shaft 5 and the pivoting lever 7 consequently form a tension roller carrier which can pivot about its pivot axis 10, which is the axis of rotation of shaft 5, in the bearing sleeve 3, wherein the tension roller 9, which is rotatable about its axis of rotation 11 parallel to the pivot axis 10 and extending at a distance, exerts a variable tension force on a driving belt.

To generate the tension force, the device has a tension spring 12 which concentrically encompasses the bearing sleeve 3 as a cylindrical torsion helical spring The tension spring 12 is axially supported with one end on the pivoting lever 7 and with the other end on housing 1. The tension spring 12 generates in the circumferential direction the tension force for the tension roller 9 bearing against the belt and in the axial direction a pressure force which tends to press the shaft 5 out of the bearing sleeve 3. At the end facing away from the pivoting lever 7, a pressure disk 13 is fastened on the shaft 5, which disk is disposed within a recess 14 of the housing 1. On the front face facing away from the tension spring 12 of the housing 1 is disposed a friction disk 15 against which the pressure disk 13 bears and on which the pressure disk 13 exerts a force due to the axial action of the tension spring 12. This arrangement represents the friction device of the device which dampens the pivot motions of the shaft 5 with the pivoting lever 7 and the tension roller 9 during operation.

According to the invention, a radial projection 16 is provided on the pressure disk 13 at a peripheral point which projection during normal operation is disposed at a small distance to the free end 17 of a stop body 18. With its other fixed end 19, the stop body 18 is fastened on the housing 1 in whose recess 14 it is disposed. The stop body 18 is a bent plate and has the shape of a horseshoe. It can be for example a bimetallic plate or a plate made of a memory alloy so that the position of its free end 17 varies with the temperature. The free end 17 forms a stop for the projection 16 of the pressure disk 13.

The rotation of the shaft 5 and pressure disk 13 and, consequently, the pivot motion of the pivoting lever 7, on which is supported the tension roller 9, is hindered when the projection 16 of the pressure disk 13 bears against the free end 17 of the stop body 18. The stop body 18 is laid out with respect to its heatdependent behavior so that during the cooling of the motor block its free end 17 approaches the projection 16 of the pressure disk 13 and if necessary, turns the pressure disk 13 in the direction of belt tensioning. This motion corresponds in its magnitude approximately to the motion of rotation of the tension roller 9 during cooling of the motor required to prevent a tooth jumping. This means that with the motor running, the relative distance between the free end 17 of the stop body 18 and the projection 16 of the pressure disk 13 remains approximately constant and is independent of the thermal expansion of the motor block. This distance is so great that the tension roller 9 under all operating conditions of the running motor can run freely. It is however small enough to prevent a tooth jump when the motor is turned off. The stop body 18 is dimensioned so that it can absorb the resulting force which acts upon the belt tension roller with the counter tension of the cam drive.

Various modifications of the belt tightening device of the invention may be made without departing from the spirit or scope thereof and it is to be understood that the invention is intended to be limited only as defined in the appended claims.

What I claim is,

1. A tightening device for a drive belt in an internal combustion engine, particularly for the toothed belt in the camshaft gear with a tension roller supported on a pivoting lever comprising a tension spring (12) acting upon the pivoting lever in the direction of tension, a blocking device opposing the motion of the pivoting lever whose blocking element changes its position as a function of the temperature, characterized in that the blocking element is formed as an end stop by a free end (17) of a preferably plate-shaped stop body (18) whose other end (19) is held in a fixed housing (1), and the end stop in the operating state of the internal combustion engine is disposed at a distance to the adjacent support face of the pivoting lever (7).

2. A tightening device of claim 1 wherein the stop body (18) is a horseshoe-shaped plate.

3. A tightening device of claim 1 wherein the stop body (18) is a bimetallic plate.

4. A tightening device of claim 1 wherein the stop body (18) is a plate made of a memory alloy.

5. A tightening device of claim 1 wherein the support face of the pivoting lever (7) for the free end (17) of the stop body (18) is made as a projection (16) of a disk fixedly connected to the pivoting lever (7).

6. A tightening device of claim 1 wherein the pivoting lever (7) is an eccentric lever fastened on one end of a shaft (5) rotatably supported in the housing (1).

7. A tightening device of claim 5 wherein the disk having the projection (16) is a pressure disk (13) of a damping device for the lever motions.

8. A tightening device of claim 7 wherein the pressure disk (13) is fastened on the end of the shaft (5) facing away from the eccentric lever.

9. A tightening device of claim 1 wherein the tension spring (12) is made as a helical spring encompassing the shaft (5), which spring presses a pressure disk (13) in the axial direction of the shaft (5) against a friction disk (15) of the damping device bearing against the housing (1).

* * * * *